United States Patent [19]
Gerdisch et al.

[11] Patent Number: 6,141,566
[45] Date of Patent: Oct. 31, 2000

[54] CO-LOCATED OMNIDIRECTIONAL AND SECTORIZED BASE STATION

[75] Inventors: Mitchell R. Gerdisch, Naperville, Ill.; John A. Kilpatrick, Lexington, Mass.

[73] Assignee: Tellabs Operations, Inc., Lisle, Ill.

[21] Appl. No.: 09/228,569

[22] Filed: Jan. 11, 1999

[51] Int. Cl.[7] .............................. H04B 7/26; H04B 15/00; H04Q 7/20
[52] U.S. Cl. .................. 455/562; 455/562; 455/453; 455/561; 455/504; 375/347; 370/249
[58] Field of Search ...................... 455/562, 522, 455/442, 453, 561, 456, 65, 101, 272, 275, 277.1, 277.2; 375/347; 370/249; 456/11.1, 9–10

[56] References Cited

U.S. PATENT DOCUMENTS

| | | | |
|---|---|---|---|
| 4,135,156 | 1/1979 | Sanders, Jr. et al. | 455/562 |
| 5,408,679 | 4/1995 | Masuda | 455/11.1 |
| 5,452,471 | 9/1995 | Leopold et al. | 455/277.1 |
| 5,508,707 | 4/1996 | Leblanc et al. | 455/561 |
| 5,530,921 | 6/1996 | Dulong et al. | 455/120 |
| 5,541,978 | 7/1996 | Brunner et al. | 379/60 |
| 5,548,807 | 8/1996 | Ueda | 455/562 |
| 5,551,056 | 8/1996 | Koponen et al. | 455/8 |
| 5,564,121 | 10/1996 | Chow et al. | 455/562 |
| 5,606,727 | 2/1997 | Ueda | 455/561 |
| 5,614,914 | 3/1997 | Bolgiano et al. | 342/364 |
| 5,615,409 | 3/1997 | Forssen et al. | 455/562 |
| 5,663,990 | 9/1997 | Bolgiano et al. | 375/347 |
| 5,669,063 | 9/1997 | Brockel et al. | 455/506 |
| 5,724,666 | 3/1998 | Dent | 455/562 |
| 5,761,194 | 6/1998 | Bahlenberg | 370/315 |
| 5,809,401 | 9/1998 | Meidan et al. | 455/63 |
| 5,859,838 | 1/1999 | Soliman | 455/562 |
| 5,937,019 | 8/1999 | Padovani | 375/358 |

*Primary Examiner*—Lee Nguyen
*Assistant Examiner*—Simon Nguyen
*Attorney, Agent, or Firm*—McAndrews, Held & Malloy, Ltd.

[57] ABSTRACT

A preferred embodiment of the present invention provides a cell site base station configuration for a wireless communications system that makes use of a sectorized base station co-located with an omnidirectional base station. The sectorized base station has a sectorized antenna system and the omnidirectional base station has an omnidirectional antenna. The configuration may also include a controller that monitors the base station for communications links subject to adverse conditions and reassigns any such links to the omnidirectional base station. The adverse conditions monitored for may include multiple fade, equipment failure and a lack of available channels. The controller may also monitor the omnidirectional base station for links that can be moved to the sectorized base station and reassign any such links to the sectorized base station. The configuration may also include a network that interconnects the sectorized base station, the omnidirectional base station and the controller.

21 Claims, 3 Drawing Sheets

CO-LOCATED OMNIDIRECTIONAL AND SECTORIZED BASE STATION

BACKGROUND OF THE INVENTION

The present invention generally relates to wireless communication systems. In particular, the present invention relates to co-located omnidirectional and sectorized base stations providing increased capacity, redundancy and spatial diversity in a base station within a wireless communication system.

In a cellular system, a base station is used in each cell to provide the link between subscriber units within the cell and the rest of the communications network. One type of base station provides omnidirectional coverage. Because the antenna of an omnidirectional base station transmits and receives signals equally well in all directions, signals emanating from the base station may interfere with signals in surrounding cells in all directions. Thus, frequency reuse within the entire wireless communications network must be limited in order to ensure reliable communications. Limited frequency reuse within the cellular system results in decreased system capacity, and thus lower revenues may result. A typical frequency reuse rate in an omnidirectional base station is every seventh or twelfth frequency.

To overcome the problem of limited frequency reuse, base stations configured to provide coverage to a number of sectors radially distributed around the base station were developed. These base stations (known as sectorized base stations) allot available frequencies to each sector in such a way that frequency reuse throughout the cellular network is increased. Because the coverage area of the base station is subdivided into sectors, each of which is supported by a separate directional antenna aligned with it, signal interference with surrounding cells is reduced. A typical frequency reuse rate in a sectorized base station is every fourth or seventh frequency.

However, sectorized base stations also have drawbacks. Because the frequencies are allotted between the multiple sectors, subscriber units within a given sector can only use a fraction of the channels available to the entire base station, which reduces the trunking efficiency of that cell. For example, if an omnidirectional base station with 60 channels were replaced with a sectorized base station having three sectors, the sectorized base station could only provide 20 channels to subscribers located in any one of the sectors (ignoring for a moment the better frequency reuse). With a 1% blocking probability, these 20 channels can support 12 Erlangs of traffic in each sector, and 36 Erlangs in the entire base station. On the other hand, an omnidirectional base station could provide a trunking pool of 60 channels to subscribers no matter where they are within the cell. These channels could support 46.9 Erlangs of traffic at the same blocking rate. Thus, a portion of the capacity gain achieved by improving the frequency reuse through sectorization is lost due to a decrease in trunking efficiency.

Another problem encountered with both omnidirectional and sectorized base stations is the cost of combating the occurrence of multipath fades. Multipath fading refers to signal attenuation caused when multiple propagation paths of different lengths exist for the signals traveling between the base station and a subscriber unit. As these multiple signals arrive at the receiver of either a subscriber unit or the base station, they may be out of phase with each other. When they are combined to form the received communications signal, constructive or destructive addition may occur. If destructive addition results, the resulting communications signal may be greatly attenuated.

For the reverse link (subscriber unit to base station), spatial diversity is often used to combat multipath fading. Spatial diversity can be achieved when multiple atennas are available at the base station, allowing for a choice of signal source. However, this requires not only additional antenna hardware, but also signal processing hardware to effectively combine the signals from the multiple antennas. This is costly. On the forward link (base station to subscribe unit), spatial diversity is impractical due to the size limitations of the mobile subscriber unit, and therefore higher transmit power is needed from the cell site. This too is costly. In the case of a stationary or fixed subscriber unit, multiple antennas could be deployed, but cost again becomes an issue.

Yet another problem to address with base stations is the need for redundancy. A malfunction in equipment at the base station may lead to a loss of wireless communications service within the cell covered by an omnidirectional base station. In the case of a cell covered by a sectorized base station, a malfunction may cause loss of service in one sector or the entire cell. Thus, it was possible for equipment failures to cause hundreds of subscriber units to be without service. Redundancy is typically provided by redundant CPUs, redundant trunk lines, spare channel cards and spare antennas.

The presence of these and other problems in past system demonstrates that a need has long existed for an integrated approach to base station design that provides increased capacity, spatial diversity and redundancy within a cell of a wireless communications system.

SUMMARY OF THE INVENTION

It is an object of the present invention to provide increased capacity that is available to all subscribers within a cell of a wireless communications network.

Another object of the present invention is to provide for spatial diversity within a cell of a wireless communications network.

Still another object of the present invention is to provide for redundancy of communications resources within a cell of a wireless communications network.

Yet another object of the present invention is to provide mechanisms to efficiently route and hand off calls to maximize use of the channels available to the cell within a wireless communications network.

Yet another object of the present invention is to increase revenue by reducing the number of cell sites needed in a wireless communications network by increasing capacity at available cell sites.

One or more of the foregoing objects are met in whole or in part by a preferred embodiment of the present invention, which provides a cell site base station configuration for a wireless communications system that makes use of a sectorized base station co-located with an omnidirectional base station. The sectorized base station has a sectorized antenna system and the omnidirectional base station has an omnidirectional antenna.

The configuration may also include a controller that monitors the base station for communications links subject to adverse conditions and reassigns any such links to the omnidirectional base station. The adverse conditions monitored for may include multipath fade, equipment failure and a lack of available channels. The controller may also monitor the omnidirectional base station for links that can be moved to the sectorized base station and reassign any such links to the sectorized base station. The configuration may also include a network that interconnects the sectorized base station, the omnidirectional base station and the controller.

DETAILED DESCRIPTION OF THE PREFERRED EMBODIMENT

Figure 1:
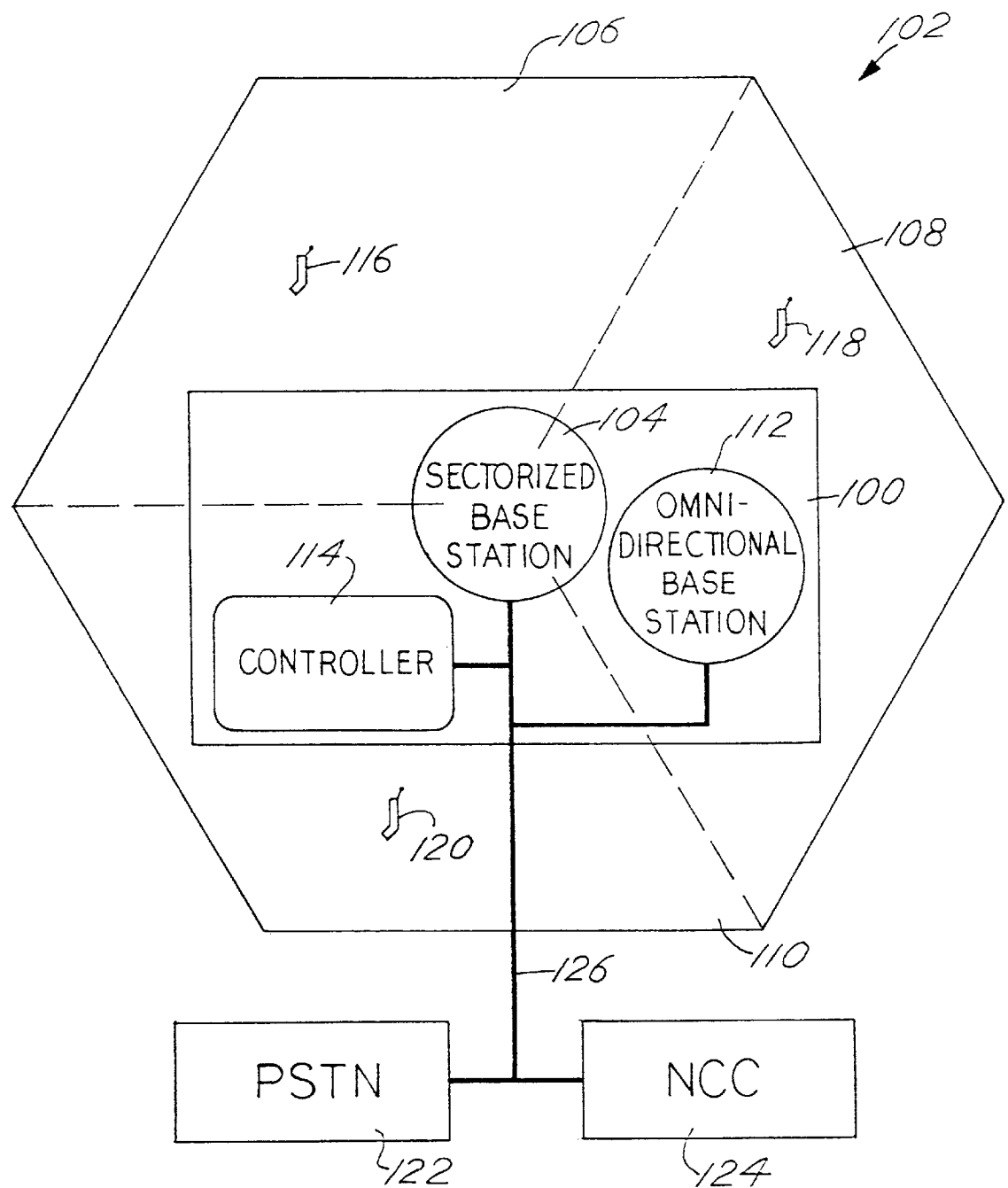
FIG. 1 illustrates a schematic diagram of a co-located omnidirectional and sectorized base station configuration for a cell site according to the present invention.

FIG. 1 illustrates a cell site 100 that serves a cell 102 of a wireless communications network. The cell site 100 generally includes a sectorized base station 104 with three sectors of coverage 106, 108 and 110. The cell site 100 may also include an omnidirectional base station 112 with omnidirectional coverage. The cell site 100 also includes a controller 114. Subscriber units 116, 118 and 120 are shown present in the cell 102. The equipment at the cell site 100 may be linked together, to other components of the wireless communications network, to a public switched telephone network (PSTN) 122, and to a network control center (NCC) 124, by a network link 126 (for example, a T3 line).

The presence of both the sectorized base station 104 and the omnidirectional base station 112 provides many advantages over past implementations of base station technology at a cell site. The present invention, for example, provides redundancy of communications links within the cell site 100. In other words, if the subscriber unit 116 is in communication with the sectorized base station 104 and the sectorized base station 104 fails, then the subscriber unit 116 may still establish a communications link within the cell 102 by communicating with the omnidirectional base station 112. Alternatively, if the subscriber unit 116 is in communication with the omnidirectional base station 112 and the omnidirectional base station 112 fails, then the subscriber unit 116 may still establish a communications link within the cell 102 by communicating with the sectorized base station 104.

The present invention also provides for additional capacity within the cell 102. The presence of the omnidirectional base station 112 at the cell site 100 provides an extra supply of "reserve" channels that are available to the subscriber units 116, 118 and 120, regardless of their location within the cell 102. This overcomes a disadvantage of using only a sectorized base station. For example, consider a cell site having only a sectorized base station with three sectors and 300 channels allocated throughout the cell. Then, typically, a maximum of 100 channels would be available to subscriber units within each of the three coverage sectors.

In a base station configuration such as that shown in FIG. 1, assigning the same 300 channels dynamically increases the maximum number of channels available within each sector. For example, by assigning 75 channels to each of the sectors 106, 108 and 110, of the sectorized base station 104 and 75 channels to the omnidirectional base station 112, the maximum number of channels available to the subscriber units 116, 118 and 120 in each of the three sectors is increased to 150 (75 from that portion of the sectorized base station 104 covering the specific sector and 75 from the omnidirectional base station 112). In essence, the omnidirectional base station 112 provides reserve channels that may be made available to the subscriber units 116, 118 and 120 in any of the three sectors 106, 108 and 110 during, for example, times of heavy call volume within a particular sector.

Even when the frequency reuse benefits of sectorization are considered, capacity may be slightly increased using the base station configuration of FIG. 1. For example, consider a fairly typical cellular deployment with tri-sectored cell sites and a frequency reuse rate of four. In this case 104 channels are allocated to each cell site, and 34 channels are available to each sector. Each sector can then carry 22.9 Erlangs of traffic at a 1% blocking rate, for a total of 68.7 Erlangs per cell site. If 77 of the total channels system wide were to be allocated for the omnidirectional base stations using a frequency reuse of seven, then 84 channels can still be used in each sectorized base station, with 28 channels in each sector. The total capacity of this system has been calculated through simulation to be 70 Erlangs.

The present invention also provides for spatial diversity for communications to fixed subscribers within the cell 102. Due to independent positioning of antennas between the base stations, the signals received by the antenna of the sectorized base station 104 will be uncorrelated with the signals received at the antenna of the omnidirectional base station 112. Thus, multipath fades (resulting in signal loss or severe attenuation) of communications signals from the subscribed units 116, 118 and 120 may be overcome by handing off a call from one base station to the other base station. For example, if the subscriber unit 118 is in communication with the sectorized base station 104 and a multipath fade occurs, the sectorized base station 104 may hand off the call to the omnidirectional base station 112 in an attempt to alleviate the multipath fade. Alternatively, if the subscriber unit 118 is in communication with the omnidirectional base station 112 and a multipath fade occurs, the omnidirectional base 112 station may hand off the call to the sectorized base station 104 in an attempt to alleviate the multipath fade.

In order that the reserve channels on the omnidirectional base station be available when needed, the controller 114 maintains the communications link assignments of subscriber units on the sectorized base station 104 whenever possible. A communications link assignment is a mapping of a subscriber unit to a time and frequency slot that corresponds to a particular channel on a particular base station. The controller 114 monitors the sectorized base station 104 and the omnidirectional base station 112 to effect handoffs when conditions warrant. As one example, when the controller 114 detects a fault in the equipment of the sectorized base station 104, the controller 114 may signal the sectorized base station 104 to handoff its current subscriber units to the omnidirectional base station 112. Similarly, if the controller 114 detects that a communications link between the subscriber unit 116, for example, and the sectorized base station 104 is experiencing a multipath fade, the controller 114 may signal the sectorized base station 104 to hand off the subscriber unit 116 to the omnidirectional base station 112.

Occasionally, a subscriber unit, such as the subscriber unit 118, may have established communications using the omnidirectional base station 112 because no channels assigned to the sector 108 of the sectorized base station 104 were available. In such cases, the controller 114 may monitor channel availability within the sector 108 of the sectorized base station 104 and signal the omnidirectional base station 112 to handoff the subscriber unit 118 to the sectorized base station 104 when a channel becomes available.

The controller 114 may be, for example, implemented in software running on a general purpose processor or a hardwired apparatus for detecting adverse conditions within the cell 102. The adverse conditions that the controller 114 may detect include, as examples, multipath fades, equipment failure within either of the base stations 104 or 112, and the presence of idle channels in the sectorized base 104 station that may be used for a communication link currently on the omnidirectional base station 112. Suitable controllers may be, for example, those used for handoff compatibility with the North American IS-136 cellular standard extended to recognize the conditions noted above.

In wireless systems which provide a method for coding channels as preferred or non-preferred (e.g., IS-136 systems), the preferential selection of channels from the sectorized base station 104 may be accomplished using the Digital Control Channel (DCCH) of each of the base stations 104 and 112. The channels assigned to the sectorized base station 104 may, for example, be made 'Preferred', while the channels on the omnidirectional base station 112 may be made 'Non-Preferred'.

In systems where a channel can not itself be marked preferred or non-preferred, there are several ways in which communications may be kept preferentially on the sectorized base station 104. For example, the subscriber units 116, 118 and 120 may be programmed with a priority list of control channels that would include the control channels of the sectorized base stations within the wireless communications system. Another option, particularly useful in analog systems, is to implement a handoff mechanism that moves traffic from the omnidirectional base station 112 to the sectorized base station 104 whenever there are idle channels in the appropriate sector of the sectorized base station 104. Although not required, the handoff may be done when communications signals would not be attenuated (e.g., due to fading) by the handoff. In other words, the sectorized base station 104 may monitor the possible handoff destination channels to determine which channels have acceptable signal strength of quality. This may further the goal of keeping traffic on the sectorized base station 104 whenever there are no adverse conditions present.

Figure 2:
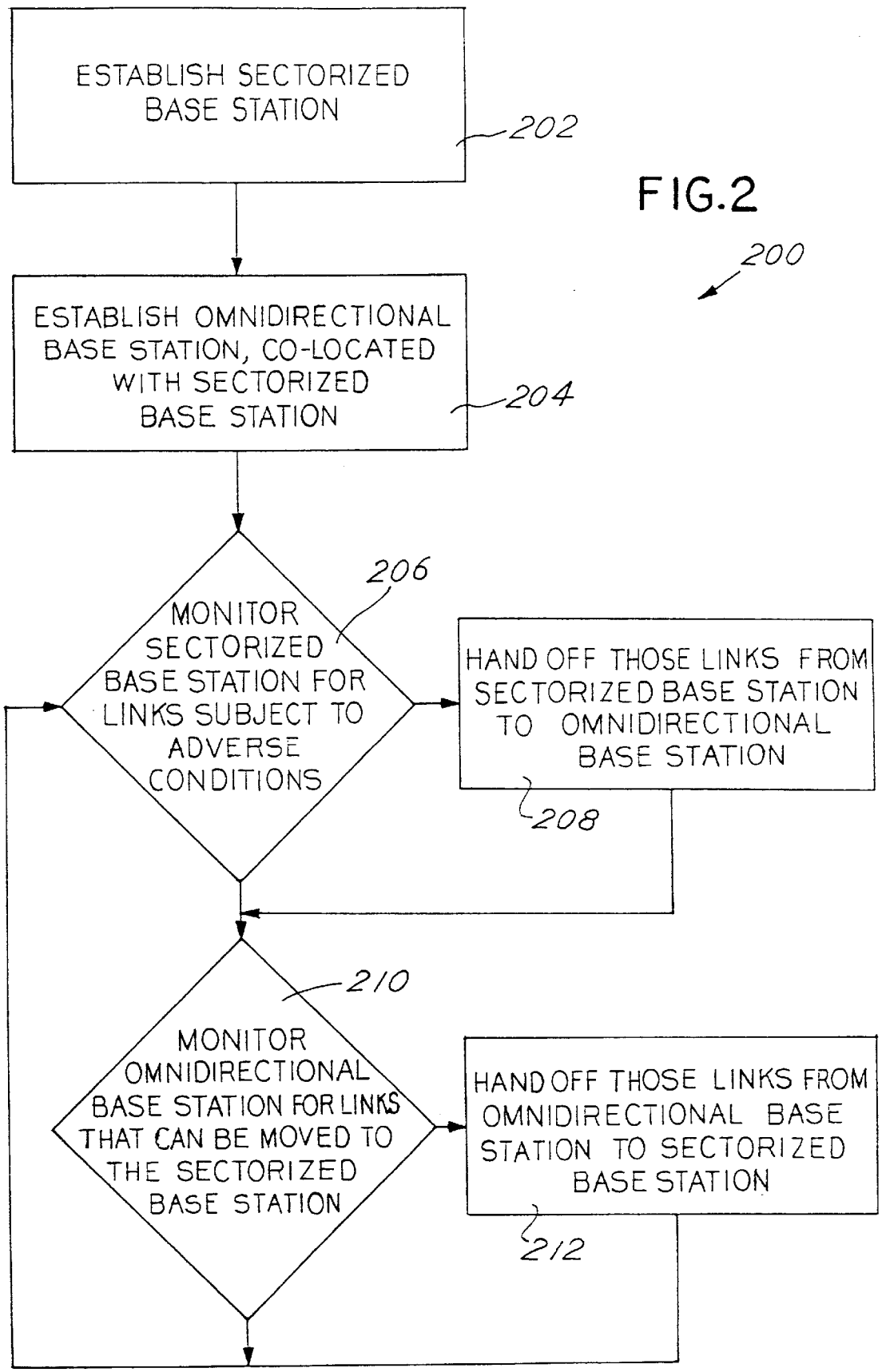
FIG. 2 illustrates a flowchart of a method for implementing a co-located omnidirectional and sectorized base station configuration for a cell site according to the present invention.

Turning now to FIG. 2, that figure illustrates a flowchart 200 of a method for implementing a co-located omnidirectional and sectorized base station configuration for a cell site according to the present invention. The flowchart 200 contains an establish sectorized base station step 202, an establish omnidirectional base station step 204, a monitor sectorized base station step 206, a sectorized to omnidirectional hand off step 208, a monitor omnidirectional base station step 210, and an omnidirectional to sectorized hand off step 212.

At step 202, a sectorized base station is established or made operational at a particular location. The sectorized base station includes a sectorized antenna system configured to provide two or more sectors of coverage. At step 204, an omnidirectional base station is established or made operational such that it is co-located (i.e., it provides coverage for approximately the same geographic area) with the sectorized base station. The omnidirectional base station includes an omnidirectional antenna.

At the monitor sectorized base station step 206, the communications links being handled by the sectorized base station are monitored for the presence of adverse conditions. These adverse conditions may include a lack of available capacity to handle the link, a multipath fade of the link or equipment failure at the sectorized base station resulting in a loss of the link. When a link is found that is subject to the effects of an adverse condition, the subscriber unit associated with it is reassigned to the omnidirectional base station at the sectorized to omnidirectional hand off step 208.

After the links on the sectorized base station are checked for adverse conditions at step 206 (and their associated subscriber units reassigned to the omnidirectional base station, if necessary, at step 208), communications links being handled by the omnidirectional base station are checked to determine if they may be moved to the sectorized base station at the monitor omnidirectional base station step 210. This may occur, for example, when an adverse condition that caused a communication link to be handed off to the omnidirectional base station abates. Furthermore, if there are any links on the omnidirectional base station that may be moved to the sectorized base station, their associated subscriber units are reassigned to the sectorized base station at the omnidirectional to sectorized hand off step 212.

Figure 3:
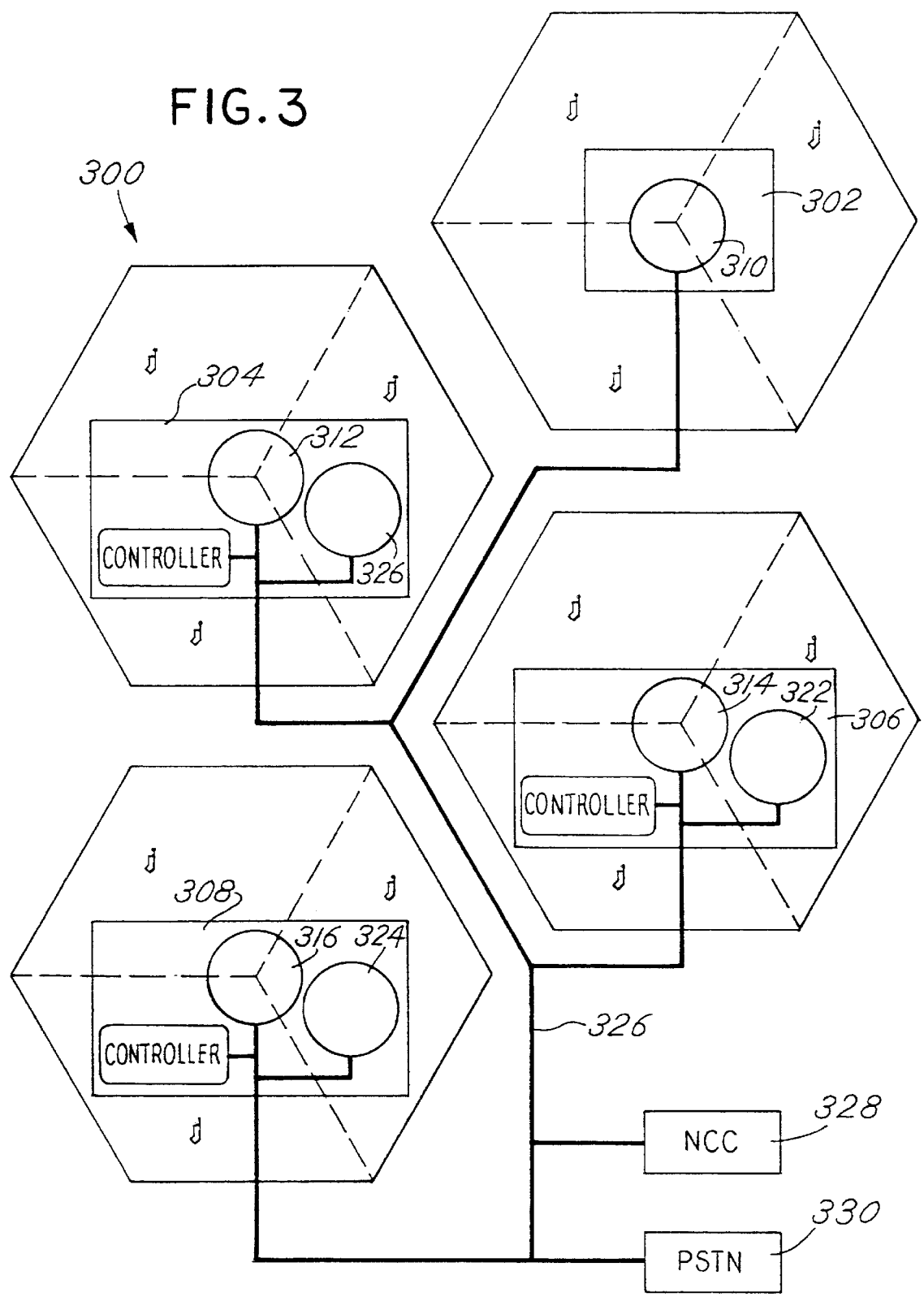
FIG. 3 illustrates a schematic diagram of a cellular network comprised of cells making use of co-located omnidirectional and sectorized base station configurations according to the present invention.

With reference now to FIG. 3, that figure illustrates a schematic diagram of a cellular network 300 comprised of cells having cell sites making use of a co-located omnidirectional and sectorized base station configuration according to the present invention. The cellular network 300 has four cell sites 302, 304, 306 and 308. A wireless communications network according to the present invention may have any number of cell sites (including one). The cell sites within the cellular network 300 may all use the co-located sectorized and omnidirectional base station configuration of the present invention (as illustrated in and described in conjunction with FIG. 1), or they may use a conventional base station configuration.

As depicted in FIG. 3, the cell site 302 of the cellular network 300 uses a conventional sectorized base station 310 only. Each of the cell sites 304, 306 and 308 of the cellular network 300 uses a sectorized base station 312, 314 and 316, co-located with an omnidirectional base station 320, 322 and 324, respectively. Each of the cell sites 304, 306 and 308, (and there included base stations) operate essentially as the cell site discussed above in conjunction with FIG. 1.

While the cell sites 304, 306 and 308, of the cellular network 300 are shown as being similar in structure and function to the cell site discussed above in conjunction with FIG. 1, it is not necessary for any specific number of the cell sites within a cellular network to be so configured. A network may contain, in any ratio, conventional cell sites interspersed with cell sites configured according to the present invention. It is not necessary that each cell using a sectorized base station (either alone or co-located with an omnidirectional base station) implement the same number of sectors. The cell sites 302, 304, 306 and 308 may also be interconnected to each other by a network 326. The network 326 may be, for example, a T3 line. The network 326 may also connect the cell sites 302, 304, 306 and 308 to a network control center (NCC) 328 or a public switched telephone network (PSTN) 330.

The present invention thus overcomes the various limitations found in prior cell sites. The present invention provides for increased capacity within a wireless communications system by providing for increased frequency reuse within the system as a whole (by configuring the sectorized base station as sectorized); and by providing subscriber units in a given sector of a cell additional capacity that may be utilized in times of heavy call volume (by configuring the omnidirectional base station as omnidirectional). Furthermore, the present invention also provides for a means to compensate for multipath fades by providing spatial diversity within a cell. Also, by having two base stations serving each cell, the present invention provides redundancy for communications within the cell.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A cell site base station configuration for a wireless communication system, the base station configuration comprising:

a sectorized base station including a sectorized antenna system providing sectorized coverage for a cell;

an omnidirectional base station coupled to and co-located with said sectorized base station, said omnidirectional base station including an omnidirectional antenna providing omnidirectional coverage for the cell;

a plurality of reserve channels supported and held in reserve by said omnidirectional base station; and a controller for preferentially maintaining communication link assignments between subscriber units and said sectorized base station by temporarily reassigning a disadvantaged subscriber unit affected by an adverse condition from said sectorized base station to a selected reserve channel of said omnidirectional base station, and reassigning said disadvantaged subscriber unit to said sectorized base station when said adverse condition abates, thereby freeing said selected reserve channel.

2. The base station configuration of claim 1, further comprising a network link for interconnecting said controller, said sectorized base station and said omnidirectional base station.

3. The base station configuration of claim 1, wherein said above condition is a multipath fade.

4. The base station configuration of claim 1, wherein said adverse condition is an equipment failure.

5. The base station configuration of claim 1, wherein said adverse condition is a lack of available channels.

6. The base station configuration of claim 1, wherein said controller further:

monitors said selected reserve channel for a second adverse condition affecting said selected reserve channel; and reassigns said disadvantaged subscriber unit to said sectorized base station, thereby freeing said selected reserve channel.

7. The base station configuration of claim 1, wherein the subscriber units store a priority list of control channels implementing a preference for the sectorized base station.

8. The base station configuration of claim 1, wherein the sectorized base station provides a plurality of channels coded as preferred channels according to the IS-136 interim standard.

9. A method of operating a cell site, the method comprising:

operating a sectorized base station including a sectorized antenna system providing sectorized coverage at a cell site;

operating an omnidirectional base station coupled to and co-located with said sectorized base station, said omnidirectional base station including an omnidirectional antenna providing omnidirectional coverage for the cell;

holding in reserve a plurality of reserve channels at said omnidirectional base station; and preferentially maintaining communication link assignments between subscriber units and said sectorized base station by temporarily reassigning a disadvantaged subscriber unit affected by an adverse condition from said sectorized base station to a selected reserve channel of said omnidirection base station, and reassigning said disadvantaged subscriber unit to said sectorized base station when said adverse condition abates, thereby freeing said selected reserve channel.

10. The method of claim 9, wherein said adverse condition is multipath fading.

11. The method of claim 9, wherein said adverse condition is equipment failure.

12. The method of claim 9, wherein said adverse condition is a lack of available channels.

13. The method of claim 9, the method further comprising the steps of:

monitoring said selected reserve channel for a second adverse condition affecting said selected reserve channel; and reassigning said disadvantaged subscriber unit to said sectorized base station, thereby freeing said selected reserve channel.

14. The method of claim 9, further comprising the step of coding a plurality of sectorized base station channels according to the IS-136 interim standard.

15. A wireless communication network comprising:

a plurality of cells;

a plurality of cell sites distributed among said plurality of cells, wherein at least one of said plurality of cell sites comprises:

a sectorized base station including a sectorized antenna system providing sectorized coverage for a cell;

an omnidirectional base station coupled to and co-located with said sectorized base station, said omnidirectional base station including an omnidirectional antenna providing omnidirectional coverage for the cell;

a plurality of reserve channels supported and held in reserve by said omnidirectional base station; and a controller for preferentially maintaining communication link assignments between subscriber units and said sectorized base station by temporarily reassigning a disadvantaged subscriber unit affected by an adverse condition from said sectorized base station to a selected reserve channel of said omnidirection base station, and reassigning said disadvantaged subscriber unit to said sectorized base station when said adverse condition abates, thereby freeing said selected reserve channel; and a network interconnecting said plurality of cell sites.

16. The wireless communications network of claim 15, wherein said adverse condition is a multipath fade.

17. The wireless communications network of claim 15, wherein said adverse condition is an equipment failure.

18. The wireless communications network of claim 15, wherein said adverse condition is a lack of available channels.

19. The wireless communications network of claim 15, wherein said controller:
- monitors said selected reserve channel for a second adverse condition affecting said selected reserve channel; and
- reassigns said disadvantaged subscriber unit to said sectorized base station, thereby freeing said selected reserve channel.

20. The wireless communications network of claim 15, wherein the subscriber units store a plurality list of control channels implementing a preference for the sectorized base station.

21. The wireless communications network of claim 15, wherein the sectorized base station provides a plurality of channels coded as preferred channels according to the IS-136 interim standard.

* * * * *